F. C. LUDLOW.
GAS HEATER.
APPLICATION FILED MAR. 14, 1911.
1,011,456.
Patented Dec. 12, 1911.
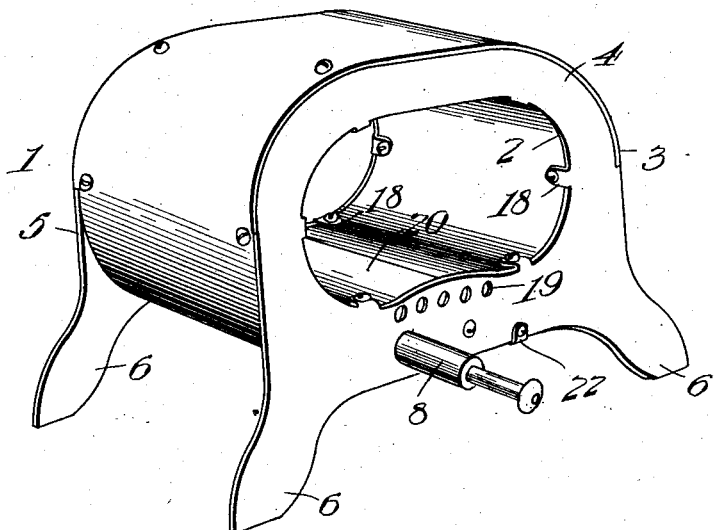
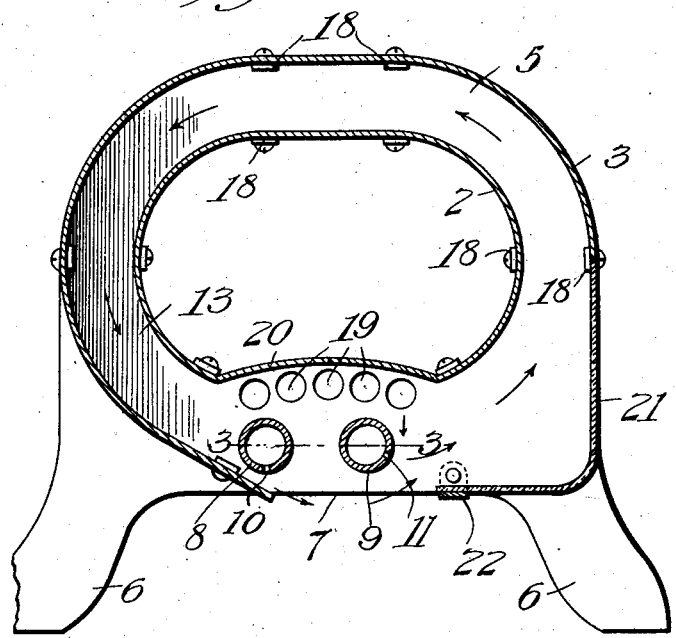
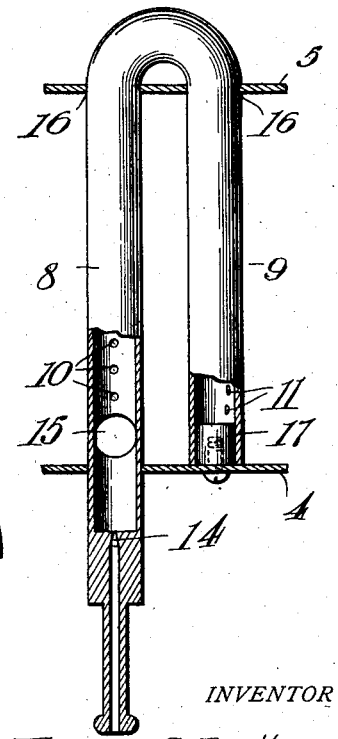
WITNESSES
INVENTOR
Freeman C. Ludlow,
By Van Buren Hillyard, Attorney.

UNITED STATES PATENT OFFICE.

FREEMAN C. LUDLOW, OF CINCINNATI, OHIO.

GAS-HEATER.

1,011,456. Specification of Letters Patent. Patented Dec. 12, 1911.

Application filed March 14, 1911. Serial No. 614,483.

*To all whom it may concern:*

Be it known that I, FREEMAN C. LUDLOW, a citizen of the United States, residing at Cincinnati, in the county of Hamilton and State of Ohio, have invented new and useful Improvements in Gas-Heaters, of which the following is a specification.

The present invention provides a heater of novel structure for utilizing a gaseous fuel, artificial or natural, as the heat producing agent, the purpose being to obtain a maximum amount of heat units from a given amount of fuel and to utilize such heat units for effective work.

A further purpose of the invention is the provision of a heater of the character aforesaid, which may be placed at any point in a room without being connected to an outlet and which will not give off any perceptible odor, the products of combustion being returned to the burner, thereby insuring a perfect combustion of all gases which is essential in a portable gas heater to attain the best possible results.

The invention contemplates a hollow body embodying inner and outer shells spaced apart, the inner shell being closed on all sides and the outer shell having an opening in its bottom or lowest part for the admission of air, and a burner arranged opposite the opening in the bottom of the outer shell and in the space formed between the two shells, said burner comprising preferably a plurality of tubes having minute openings in their length for the escape of the gas in jets to produce tongues of flame when ignited.

The invention further contemplates a novel form of burner and arrangement of jet outlets to insure a positive circulation of hot air through the space formed between the shells of the heater body and to cause the returned hot air to come in contact with the flame to consume any trace of gas that may remain therein, said burner being removable and one end thereof being closed by a plug which also serves to hold the burner in place.

The invention also consists of the novel features, details of construction and combination of parts which hereinafter will be more fully set forth and finally pointed out in the subjoined claims.

Referring to the drawings hereto attached and forming a part of the specification, Figure 1 is a perspective view of a gas heater embodying the invention. Fig. 2 is a vertical longitudinal section thereof. Fig. 3 is a horizontal section on the line 3—3 of Fig. 2.

Corresponding and like parts are referred to in the following description, and indicated in all the views of the drawing, by the same reference characters.

The body of the heater is indicated at 1 and is hollow and may be of any design and construction and embodies an inner shell 2 and an outer shell 3. End pieces 4 and 5 close the space formed between the shells 2 and 3 and have feet 6 which support the body in elevated position. The inner shell is closed on all sides. The outer shell has an opening 7 in its bottom or lower portion. The burner is located opposite the opening 7 and embodies burner tubes 8 and 9 connected at their ends on one side of the heater. Each tube has a plurality of openings in its length for the escape of gas in jets. The openings 10 of the tube 8 face downward. The openings 11 of the tube 9 face laterally to throw the jets of flame into the space 13 formed between the two shells.

The burner is of U form and consists of a tube doubled upon itself to provide the members 8 and 9. The tube 8 extends at one end beyond the side of the heater to make connection with a rubber tube commonly employed to connect gas heaters and the like with the outlet of a gas service pipe. A jet opening 14 is formed in the outer end of the tube 8 and an air opening 15 is located in the under side of the tube 8 just inside of the end piece 4. The burner is insertible through openings 16 formed in the end piece 5 and the tube 8 passes through an opening in the end piece 4. The tube 9 is closed at its open end by a plug 17 secured to the inner side of the end piece, said plug also serving to support the tube 9.

The end pieces 4 and 5 may be secured to the shells in any manner and have lugs 18 which are apertured to receive fastenings which pass through openings formed in edge portions of the shells. Openings 19 are formed in the end pieces directly above the burner for the admission of air to the flame. The lower portion of the inner shell is arched, as indicated at 20, to give ample room for the flame and insure a thorough mixing of the air entering the openings 19 therewith. A piece of mica 21 is fitted to the lower corner portion of the body to admit of the flame being observed. A bar 22 engages the lower edge of the mica 21 and protects the same and assists in holding it in place.

In the operation of the heater the jets of flame from the burner tube 9 shoot into the space 13 and start a circulation therethrough. The jets from the burner tube 8 tend to shoot downward, but, the current, set up in the space 13, causes said jets to curve around the burner tube 9, as indicated by the arrow. The inner shell is open and both shells present a great amount of surface for radiating the heat.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A gas heater comprising a horizontally disposed inner shell, an outer shell inclosing the inner shell and spaced therefrom and having an opening in its bottom, end pieces connecting the shells and closing the space formed between them, and burner tubes arranged in the space formed between the bottom portions of the shells and above the opening formed in the bottom of the outer shell, each of the burner tubes having a plurality of openings therein, the openings in one burner tube being in its bottom and the openings in the other tube being in the side remote from the first mentioned burner tube.

2. A gas heater comprising a hollow body formed of spaced shells, the inner shell being closed on all sides and having its bottom arched, and the outer shell having an opening in its bottom in line with the arched portion of the inner shell, said body having openings in its end pieces opposite the space formed between the shells and adjacent the arched portion of the inner shell, and a burner located in the space formed between the two shells and above the opening formed in the bottom of the outer shell, said burner comprising connected burner tubes having a horizontal arrangement, each of the burner tubes having a plurality of openings therein, the openings in one burner tube being in its bottom and the openings in its other tube being in the side remote from the first mentioned burner tube.

In testimony whereof I affix my signature in presence of two witnesses.

FREEMAN C. LUDLOW.

Witnesses:
ABRAHAM B. KURTZ,
MICHAEL MULLER.

---

Copies of this patent may be obtained for five cents each, by addressing the "Commissioner of Patents, Washington, D. C."